(12) United States Patent
Maki et al.

(10) Patent No.: US 9,950,449 B2
(45) Date of Patent: Apr. 24, 2018

(54) PROCESS AND TOOL FOR FORMING A VEHICLE COMPONENT

(71) Applicant: Ford Global Technologies, LLC, Dearborn, MI (US)

(72) Inventors: Clifford E. Maki, New Hudson, MI (US); Antony George Schepak, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 14/635,418

(22) Filed: Mar. 2, 2015

(65) Prior Publication Data

US 2016/0256921 A1   Sep. 8, 2016

(51) Int. Cl.
*B29C 33/52* (2006.01)
*B22D 17/24* (2006.01)
(Continued)

(52) U.S. Cl.
CPC .............. *B29C 33/52* (2013.01); *B22D 15/00* (2013.01); *B22D 17/005* (2013.01); *B22D 17/24* (2013.01); *B22D 29/001* (2013.01); *B29C 33/448* (2013.01); *B29C 41/20* (2013.01); *B29C 41/36* (2013.01); *B29C 45/14* (2013.01); *B22D 19/009* (2013.01); *B22D 19/0072* (2013.01); *B29C 2045/4464* (2013.01); *B29K 2101/10* (2013.01);
(Continued)

(58) Field of Classification Search
CPC ..... B29C 41/20; B29C 41/36; B29C 45/4457; B29C 2045/4464; B29C 33/448; B29C 33/52
See application file for complete search history.

(56) References Cited

U.S. PATENT DOCUMENTS 4,003,422 A * 1/1977 Schramm ............... B22D 15/02
164/112
4,059,143 A   11/1977 Morita et al.
(Continued)

FOREIGN PATENT DOCUMENTS

AT      228013        6/1963
DE   2727124 A1    12/1978
(Continued)

OTHER PUBLICATIONS

U.S. Office Action for U.S. Appl. No. 14/456,033, dated Aug. 11, 2016, 20 pages.
(Continued)

*Primary Examiner* — Atul P. Khare
(74) *Attorney, Agent, or Firm* — Brooks Kushman P.C.; Marta Johnston

(57) ABSTRACT

A tool and a process for forming a vehicle component is provided. An insert has a lost core generally encapsulated by a cast metal shell. The insert has an anchor surface and a first locating member spaced apart therefrom, and is shaped to form a fluid passage in the vehicle component. A first die is configured to mate with the anchor surface and constrain the insert. A second die defines a first locator recess sized to receive the first locating member and constrain the insert. The first and second dies mate with one another to form the tool. The first and second dies constrain the insert in multiple degrees of freedom.

13 Claims, 6 Drawing Sheets

(51) Int. Cl.
*B22D 17/00* (2006.01)
*B29C 41/20* (2006.01)
*B29C 33/44* (2006.01)
*B29C 41/36* (2006.01)
*B22D 15/00* (2006.01)
*B22D 29/00* (2006.01)
*B29C 45/14* (2006.01)
*F01P 3/00* (2006.01)
*B29K 101/10* (2006.01)
*B29K 105/12* (2006.01)
*B29K 307/04* (2006.01)
*B29L 31/00* (2006.01)
*B29L 31/30* (2006.01)
*B29C 45/44* (2006.01)
*B22D 19/00* (2006.01)

(52) U.S. Cl.
CPC ...... *B29K 2105/12* (2013.01); *B29K 2307/04* (2013.01); *B29L 2031/30* (2013.01); *B29L 2031/749* (2013.01)

(56) References Cited

U.S. PATENT DOCUMENTS

| | | | |
|---|---|---|---|
| 4,109,617 A | 8/1978 | Ernest | |
| 4,693,294 A | 9/1987 | Albrecht et al. | |
| 5,562,073 A * | 10/1996 | Van Bezeij | F02F 1/108 123/193.2 |
| 5,957,103 A * | 9/1999 | Takami | F02F 1/108 123/193.2 |
| 6,205,959 B1 | 3/2001 | Smetan et al. | |
| 6,479,165 B2 | 11/2002 | Fischer et al. | |
| 6,575,124 B2 | 6/2003 | Shimizu et al. | |
| 6,769,474 B2 | 8/2004 | Engels et al. | |
| 7,140,415 B1 * | 11/2006 | Wilson | B22C 9/082 164/337 |
| 8,555,950 B2 * | 10/2013 | Fabros | B22C 9/103 164/15 |
| 2002/0078850 A1 | 6/2002 | Renfro et al. | |
| 2006/0048911 A1 | 3/2006 | Newcomb | |
| 2006/0124082 A1 | 6/2006 | Grunenberg et al. | |
| 2009/0013982 A1 | 1/2009 | Yuasa et al. | |
| 2010/0175641 A1 * | 7/2010 | Yamada | B22D 19/00 123/41.72 |
| 2011/0068619 A1 | 3/2011 | Werner et al. | |
| 2013/0199749 A1 | 8/2013 | Moschini et al. | |

FOREIGN PATENT DOCUMENTS

| | | |
|---|---|---|
| DE | 102006053179 A1 | 5/2007 |
| DE | 102012021065 A1 | 8/2013 |
| EP | 1253310 A2 | 10/2002 |
| GB | 111556 | 12/1917 |
| GB | 601894 | 5/1948 |
| GB | 850676 | 10/1960 |
| GB | 878208 | 9/1961 |
| GB | 978837 | 12/1964 |
| GB | 2028424 A | 3/1980 |
| GB | 2132266 A | 7/1984 |

OTHER PUBLICATIONS

Pierri, "Lost Core New Perspectives in Die Casting", Buhler, 2012, 20 pages.
Dodiuk et al., "Bonded and Coated Abrasives", Handbook of Thermoset Plastics, Nov. 28, 2013, 1 page.
U.S. Appl. No. 14/456,033, entitled "Bore Bridge Cooling Passage", filed Aug. 11, 2014, 23 pages.
Heppes, Frank, "Stable Filled Aluminum Tubes for Foundries—Near End Outline Casting With Remarkable Material Savings", Drahtzug Stein combicore, 27 pages.
U.S. Office Action for U.S. Appl. No. 14/456,033, dated May 6, 2016, 20 pages.

* cited by examiner

PROCESS AND TOOL FOR FORMING A VEHICLE COMPONENT

TECHNICAL FIELD

Various embodiments relate to a tool and a process of forming a vehicle component.

BACKGROUND

A vehicle component may include an engine cylinder head, an engine block, a transmission case, a motor case, and the like. The various components may be formed using processes including casting and molding in a tool. The components may have various features such as complex shapes and fluid passages for a cooling jacket, lubrication system, and the like. Providing these complex shapes and passages may be challenging. For example, a sand core or other lost core may be used in a low pressure process to provide the desired features; however, limitations may arise due to small dimensions, of the desired feature on packaging limitations, the core material being unable to withstand a high pressure process, the core material being crushed, the core material shifting during the process, and the resulting component losing desired features or being otherwise incomplete.

SUMMARY

According to an embodiment, a tool for forming a component is provided with an insert having a lost core generally encapsulated by a cast metal shell. The insert has an anchor surface and a first locating member spaced apart therefrom, and is shaped to form a fluid passage in the component. A first die is configured to mate with the anchor surface and constrain the insert. A second die defines a first locator recess sized to receive the first locating member and constrain the insert. The first and second dies mate with one another to form the tool. The first and second dies constrain the insert in at least five degrees of freedom.

According to another embodiment, a process of forming a vehicle component is provided. An insert is positioned into at least two dies of a tool. The insert has a lost core within a metal shell. The dies are closed around the insert to constrain the insert relative to the tool in at least four degrees of freedom. Material is injected into the tool to form the component. The lost core is removed to form a fluid passage in the component.

According to yet another embodiment, a tool for forming an engine component is provided. An insert for the tool has a longitudinal axis, a first transverse axis, and a second transverse axis. The insert has a metal wall and a lost core having an outer surface. A portion of the outer surface is in contact with a surface of the metal wall. The lost core is shaped to provide a fluid passage in the component. The core forms a locating edge, a first locating member extending outwardly from an intermediate region of the core along the first transverse axis, and a second locating member extending outwardly from the intermediate region of the core along the second transverse axis. The second locating member is spaced apart from the first locating member. The insert also has a metal shell in contact with and covering another portion of the outer surface of the lost core. The tool has a first die configured to move in translation along the longitudinal axis and having a locating surface configured to mate with the locating edge of the insert to constrain the insert. A second die has a first locating recess sized to receive the first locating member to constrain the insert, and is configured to move in translation along the first transverse axis. A third die has a second locating recess sized to receive the second locating member to constrain the insert, and is configured to move in translation along the second transverse axis.

DETAILED DESCRIPTION

As required, detailed embodiments of the present disclosure are provided herein; however, it is to be understood that the disclosed embodiments are merely examples that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure describes a process and a tool for forming a vehicle component. An engine cylinder block formed using a lost core insert is described below as an example of a vehicle component and an application of the process, and is not intended to be limiting. The disclosure may also be applied as a process for forming other vehicle components using lost core inserts in a casting or molding process. A number of non-limiting examples of applications of the present disclosure are provided below. An engine block may be formed with a cooling jacket and/or lubrication passages. An engine cylinder head may be formed with a cooling jacket and/or lubrication passages. An insert may provide at least a portion of the cooling jacket, the lubrication passages, a lubricant drain passage, a fluid passage insert fluidly connecting an engine block and a cylinder head, and the like. Various examples of the present disclosure may also be applied to forming a transmission housing or casing, an electric motor housing, and other larger, complex castings or molded components. The insert may generally be used when forming a larger component in a tool, when positioning and/or locating of the insert is challenging, and when the insert requires fixing within the tool in multiple planes.

Figure 1:
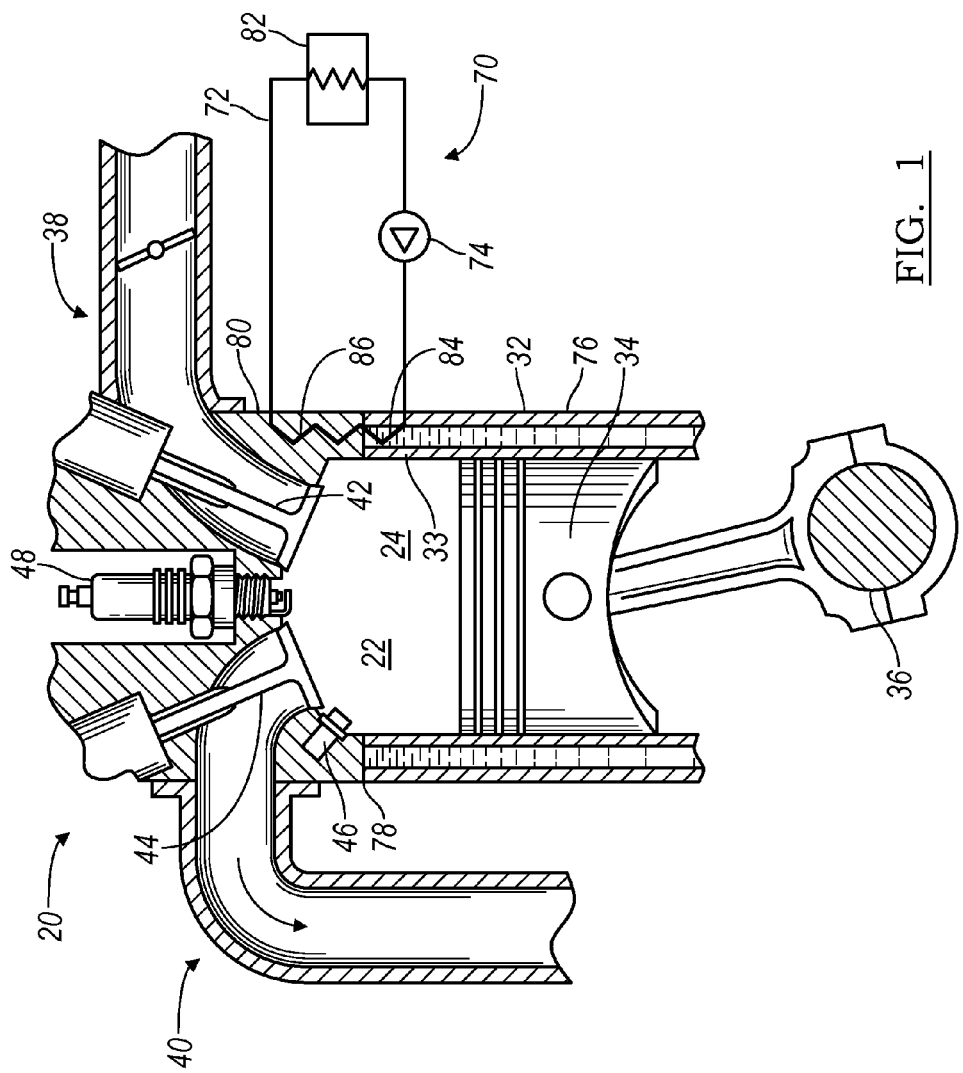
FIG. 1 illustrates a schematic of an engine configured to implement the disclosed embodiments.

FIG. 1 illustrates a schematic of vehicle components for an internal combustion engine 20. The engine 20 has a plurality of cylinders 22, and one cylinder is illustrated. In one example, the engine 20 is an in-line four cylinder engine, and, in other examples, has other arrangements and numbers of cylinders. The engine 20 block and cylinder head may be cast from aluminum, an aluminum alloy, or another metal. In another example, the engine 20 block and/or cylinder head may be cast or molded from a composite material, including a fiber reinforced resin, and other suitable materials. Additional non-limiting examples of composite materials and an associated process include: a polyester/vinyl ester mixed thermal set resin with carbon fiber in a long fiber filler used in a vacuum assisted compression molding process, a compression set charge thermal set vinyl ester with carbon fiber in a long and short fiber filled mixture used in a vacuum assisted compression molding process, a phenolic carbon fiber filled reinforced thermal set composite material used in an injection molding process, a bio-fiber filled vinyl esters thermal set composite material used in a blow molding process, and a glass filled polyester/nylon composite material used in an injection molding process. The disclosure is not limited to the composite materials and forming processes included herein, and additional materials and processes may be used according to the spirit and scope of the disclosure.

The engine 20 has a combustion chamber 24 associated with each cylinder 22. The cylinder 22 is formed by cylinder walls 32 and piston 34. The cylinder walls 32 may be formed by a cylinder liner 33, and the cylinder liner may be a different material than the block, or the same as the block. In one example, the liner 32 is a ferrous material while the remainder of the engine 20 block and head is generally provided by aluminum, an aluminum alloy, or a composite material.

The piston 34 is connected to a crankshaft 36. The combustion chamber 24 is in fluid communication with the intake manifold 38 and the exhaust manifold 40. An intake valve 42 controls flow from the intake manifold 38 into the combustion chamber 30. An exhaust valve 44 controls flow from the combustion chamber 30 to the exhaust manifold 40. The intake and exhaust valves 42, 44 may be operated in various ways as is known in the art to control the engine operation.

A fuel injector 46 delivers fuel from a fuel system directly into the combustion chamber 30 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 30. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 includes a fluid jacket 70 that may be at least partially integrated with a cylinder block 76 and/or a cylinder head 80. The fluid jacket 70 may act as a cooling system, a lubrication system, and the like. In the example shown, the fluid jacket 70 is a cooling jacket and is provided to remove heat from the engine 20. The amount of heat removed from the engine 20 may be controlled by a cooling system controller or the engine controller. The fluid jacket 70 has one or more fluid circuits 72 that may contain water, another coolant, or a lubricant as the working fluid. The fluid jacket 70 has one or more pumps 74 that provide fluid in the circuit 72 to fluid passages in the cylinder block 76 and cylinder head 80. Coolant may flow from the cylinder block 76 to the cylinder head 80, or vice versa. The fluid jacket 70 may also include valves (not shown) to control to flow or pressure of fluid, or direct fluid within the system 70 during engine operation.

Various portions and passages in the cooling jacket 70 may be integrally formed with the engine block and/or head. Cooling passages provided by fluid passages in the fluid jacket 70 may be located within the cylinder block 76 and may be adjacent to one or more of the combustion chambers 24 and cylinders 22. Similarly, cooling passages provided by fluid passages in the fluid jacket 70 may be located within the cylinder head 80 and may be adjacent to one or more of the combustion chambers 24 and cylinders 22.

The cylinder head 80 is connected to the cylinder block 76 to form the cylinders 22 and combustion chambers 24. A head gasket 78 in interposed between the cylinder block 76 and the cylinder head 80 to seal the cylinders 22. The gasket 78 may also have a slot, apertures, or the like to fluidly connect the jackets 84, 86. Fluid in the circuit 86 flows from the cylinder head 80 and out of the engine 20 to a radiator 82 or other heat exchanger where heat is transferred from the coolant to the environment.

Figure 2:
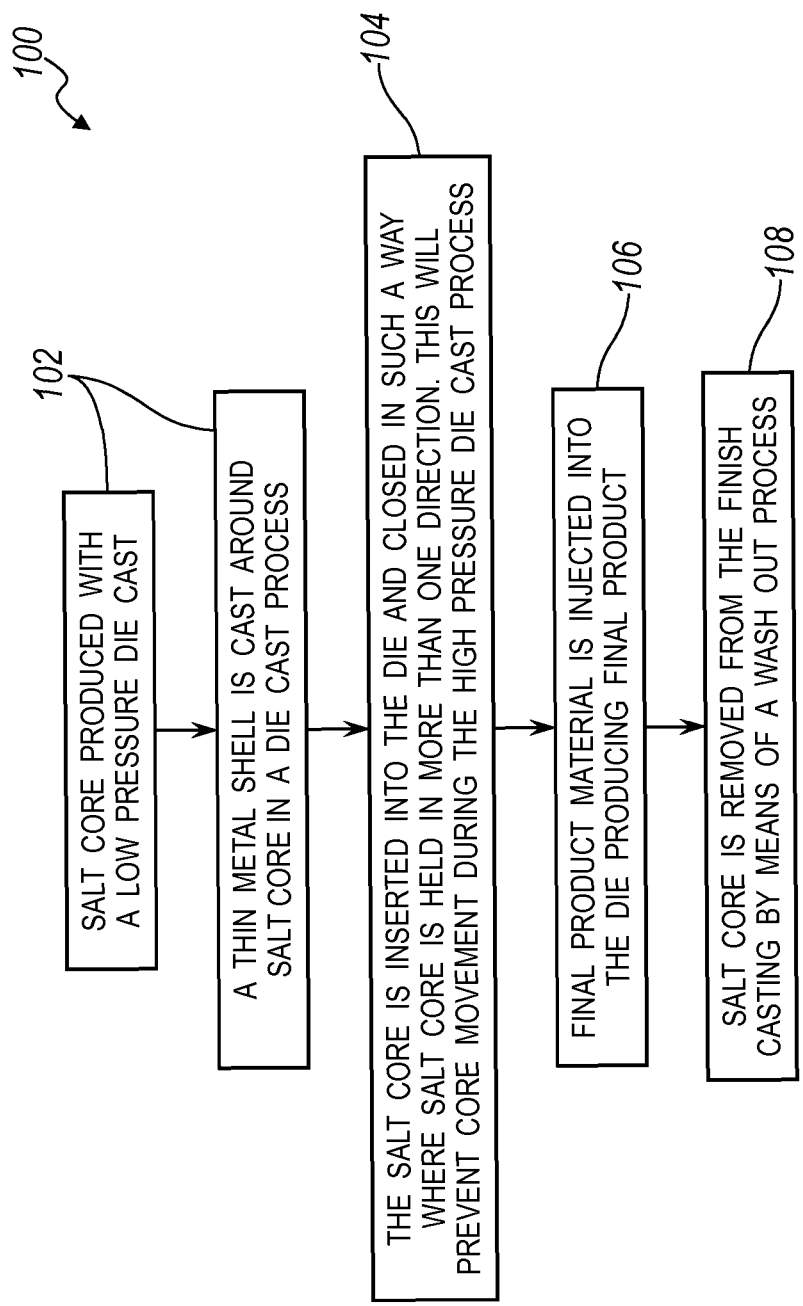
FIG. 2 illustrates a process according to an embodiment.

FIG. 2 illustrates a process or a method 100 of forming a vehicle component according to an embodiment. The process and tool used in FIG. 2 is described with respect to forming an engine block, although the process and a tool having similar features may be applied to other vehicle components as described above. The method 100 may include greater or fewer steps than shown, the steps may be rearranged in another order, and various steps may be performed serially or simultaneously according to various examples of the disclosure.

Figure 3:
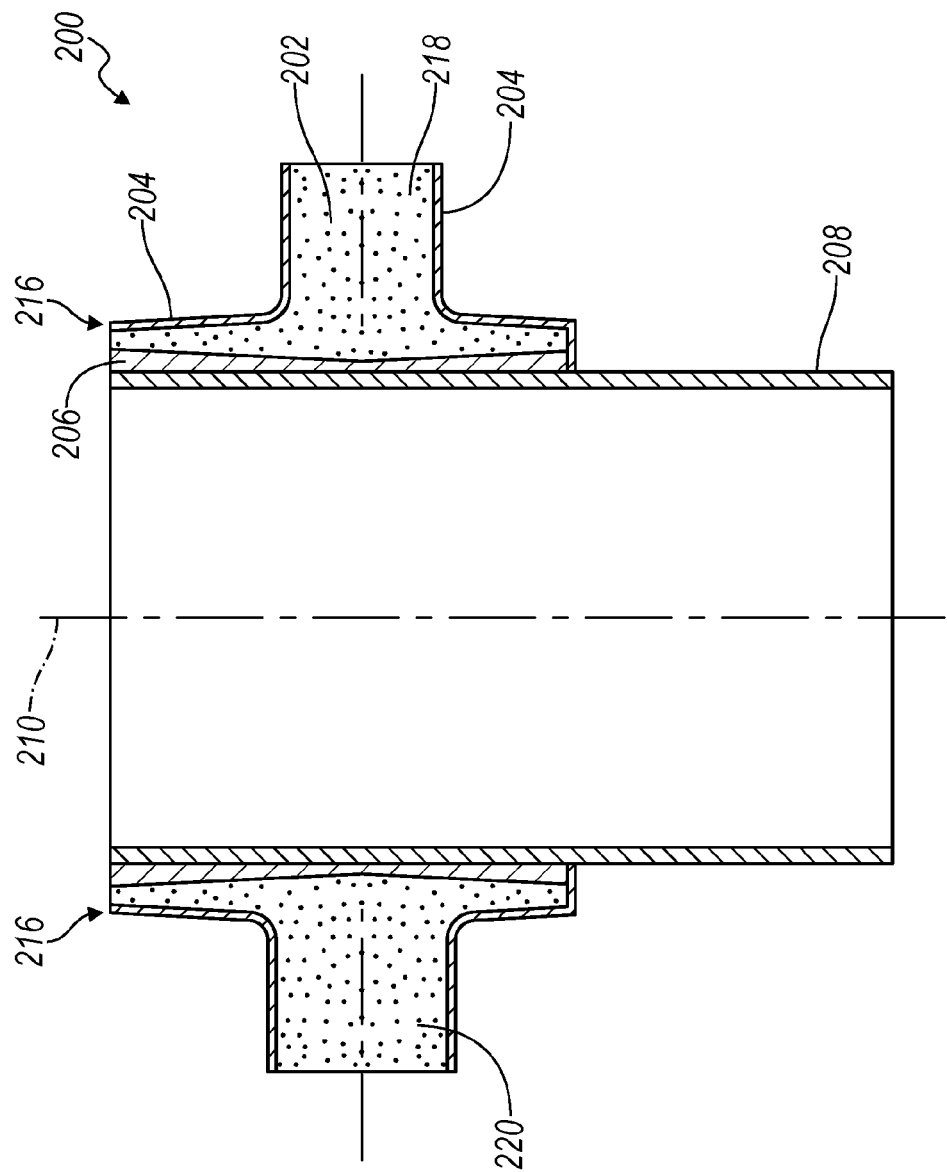
FIG. 3 illustrates a sectional view of an insert according to an embodiment for use with the process of FIG. 2.
Figure 4:
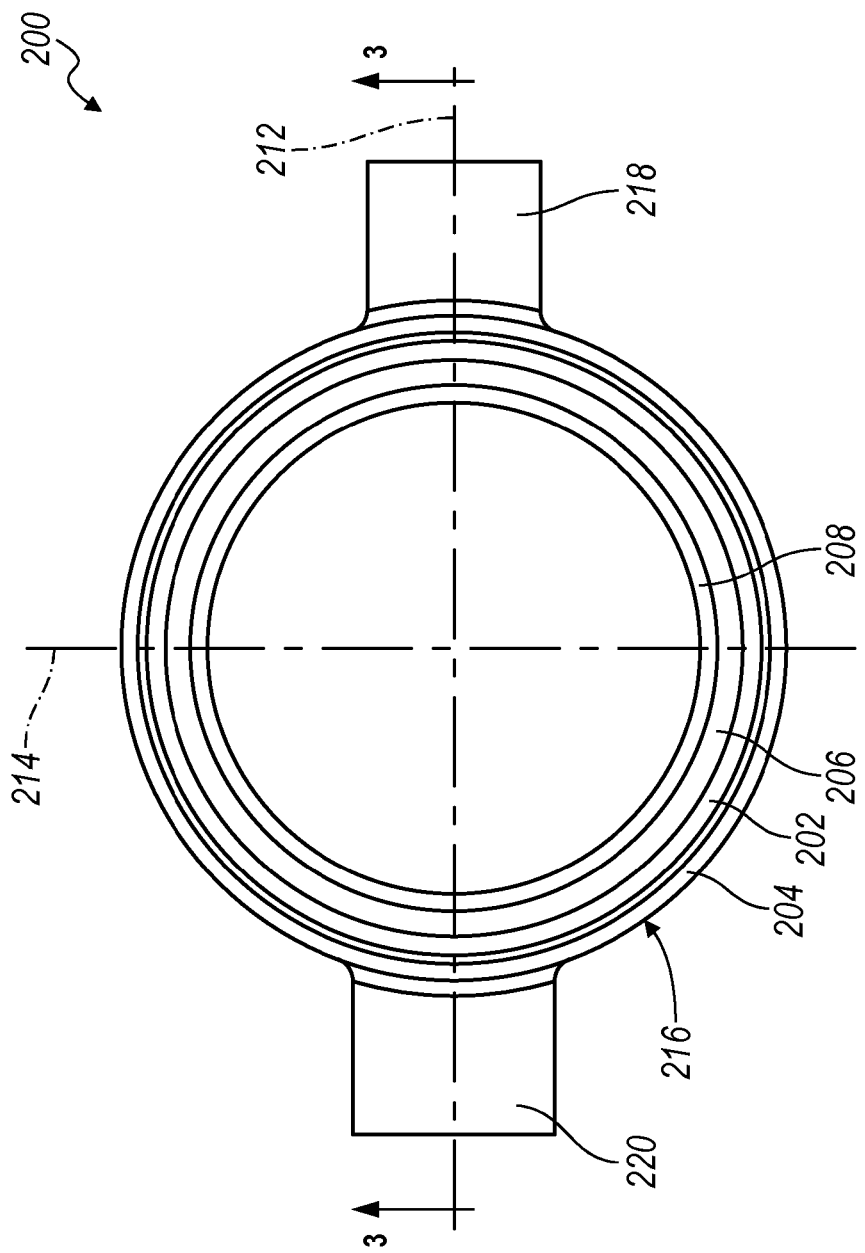
FIG. 4 illustrates a top view of the insert of FIG. 3.
Figure 5:
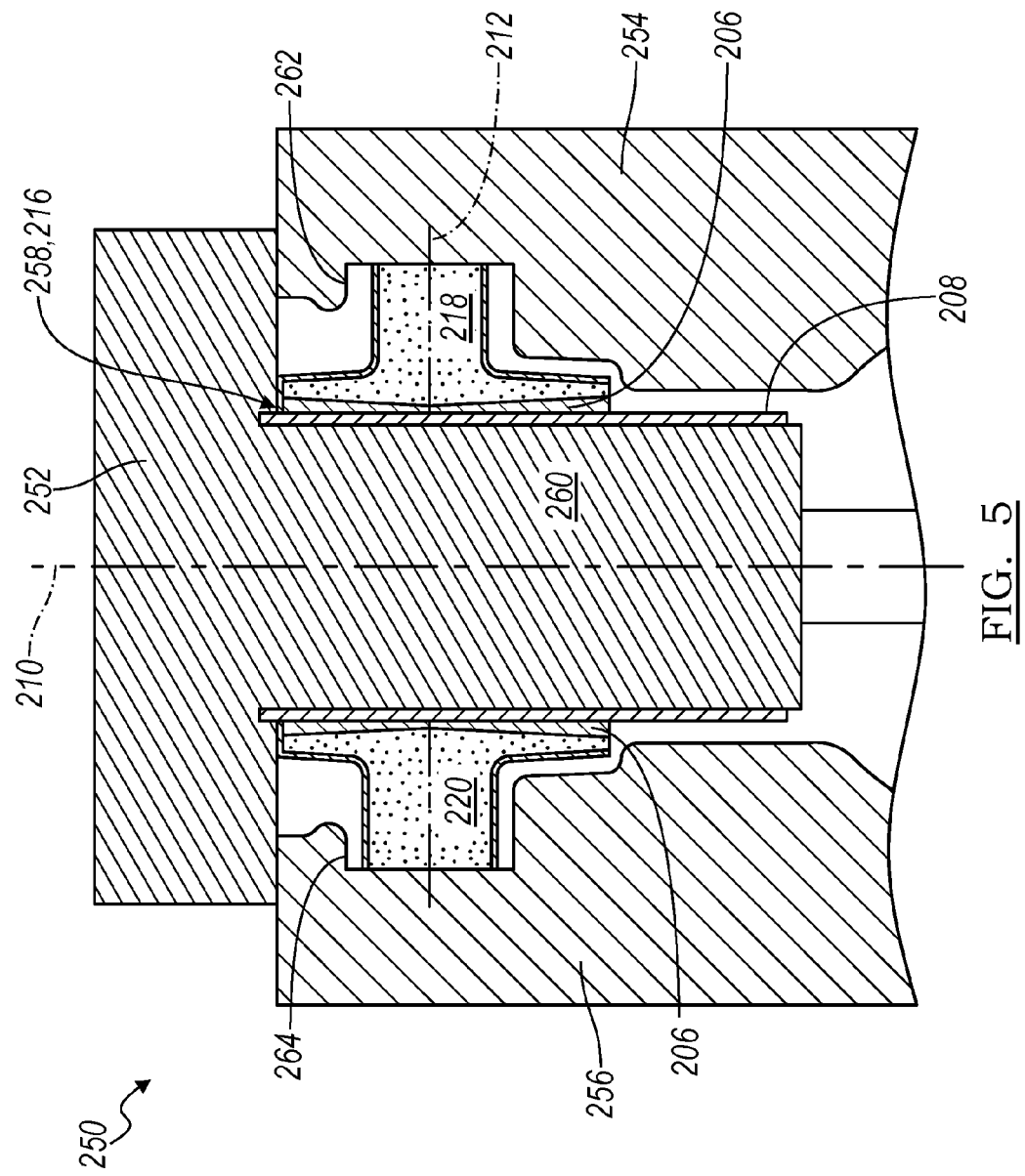
FIG. 5 illustrates a partial view of a tool and an insert for forming a vehicle component according to an embodiment.

The process 100 begins at step 102 where an insert 200 is formed or provided. An example of an insert 200 is illustrated in FIGS. 3 and 4. The insert 200 is formed before use with the tool to die cast or mold the vehicle component. The insert 200 includes a lost core region 202. A shell 204 surrounds or encapsulates the lost core 202 such that it covers at least a portion of the outer surface of the lost core 202. The lost core 202 may be a salt core, a sand core, a glass core, a foam core, or another lost core material as appropriate. The core 202 is provided generally in the desired shape and size of a portion of fluid passage, or substantially all of a passage. In the example shown, the lost core 202 forms the shape of a cooling passage for an engine cylinder in an engine cylinder block. In other examples, the core 202 is provided with a shape and size to form the desired feature of the vehicle component.

To form the insert 200, the lost core 202 is formed in a predetermined shape and size. The shell 204 is then provided around the core 202. In one example, a die casting or casting process is used to form the shell 204 while maintaining the integrity of the core 202. A die, mold, or tool may be provided with the shape of the insert 200. The core 202 is positioned within the die, and the shell 204 is cast or otherwise formed around the core 202. The shell 204 may be formed by a low pressure casting process by injecting molten metal or another material into the mold. The molten metal may be injected at a low pressure between 2-10 psi, 2-5 psi, or another similar low pressure range using a gravity feed. The material used to form the shell 204 may be the same metal or metal alloy as used to form the vehicle component, or may be a different material from the engine block or vehicle component. In one example, the shell 204 is formed from aluminum or an aluminum alloy and the vehicle component is formed from aluminum, an aluminum alloy, a composite material, a polymer, and the like. By providing the molten metal at a low pressure, the lost core 202 retains its desired shape and is retained within the shell 204. After the shell 204 cools, the insert 200 is ejected from the tool and may be ready for use.

The insert 200 may also have a metal wall 206, or other thermally conductive wall 206. In one example, the wall 206 is provided as aluminum or an aluminum alloy to interface with a composite material in the later injection process of the vehicle component. The wall 206 may be present or may be omitted when aluminum, aluminum alloy, or other metal is used in the process for forming the vehicle component. The wall 206 may be provided to increase heat transfer or provide a heat transfer channel to fluid in the passage to be formed by the core 202. The wall 206 may be provided in the die to form the insert 200 before the shell 204 is cast. The wall 206 may be in direct contact with or be adjacent to the outer surface of the core 202 and may be in direct contact with or adjacent to the shell 204. As can be seen in FIG. 3, the thickness of the wall 206 may be greater than the thickness of the shell 204.

In the present example, the insert 200 is also provided with a cylinder liner 208, such as liner 33 described above. The liner 208 may be pressed into the wall 206 or otherwise provided with the insert 200. In a further example, the liner 208 is provided at a later step in the process 100. The wall 206, in this example, provides a path for conductive heat transfer from the liner 208 to a coolant passage formed by the core 202. The wall 206 may also provide for separation between a coolant passage and the cylinder liner 208 to prevent mixing of coolant and lubricant. The wall 206 is positioned between the cylinder liner 208 and the lost core 202. The wall 206 may be direct contact with the liner 208. The wall 206 may be adjacent to or generally flush with an end of the cylinder liner 208, as shown.

The insert 200 has a longitudinal axis 210, a first transverse axis 212, and a second transverse axis 214. Although the first and second transverse axes are shown as being generally perpendicular to one another, they may be at other angles relative to one another, including acute and obtuse angles. Additionally, the first and second transverse axes may be co-linear.

The insert 200 is provided with various locating features that allow for the insert to be fixed or constrained in up to six degrees of freedom. Locating features include protrusions, anchors, lugs, recesses, touch points, edges, corners, and other surfaces that interact with the tool to position and fix the insert. By fixing or constraining the insert in a degree of freedom, the insert is prevented from moving in that degree of freedom. Of course, there may be some slight movement due to tolerances, etc. The six degrees of freedom or motion include: (i) translational motion along the axis 210, (ii) translational motion along the axis 212, (iii) translational motion along the axis 214, (iv) rotational motion about the axis 210, (v) rotational motion about the axis 212, and (vi) rotational motion about the axis 214. In other examples, the insert 200 may be provided with locating features to fix or constrain the insert in less than six degrees of freedom, for example, by fixing or constraining the insert in three, four, or five degrees of freedom. Constraining the insert in less than six degrees of freedom may be based on packaging constraints, other limitations or considerations.

The insert 200 may be provided with multiple locating features, where each locating feature generally fixes or constrains the insert 200 within specified degrees of freedom. For example, each locating feature may constrain the insert 200 within different degrees of freedom. Each locating feature may constrain the insert 200 within a predetermined number of degrees of freedom. Multiple locating features may constrain the insert 200 within the same or some of the same degrees of freedom. The insert 200 may additionally have multiple locating features that fix the insert in the same degrees of freedom. This may be useful for larger inserts or inserts with bridges or other narrow, breakable features to better constrain and locate the insert 200 within a tool.

In the example shown, the insert 200 has three primary locating features. The insert 200 has an anchor surface 216, edge or corner. The insert 200 has a first locating member 218 and a second locating member 220. The first and second locating members 218, 220 are spaced apart from one another, and may be generally opposed as shown. The first and second locating members 218, 220 are shown extending from an intermediate region of the core and insert 200, although other placements of the members 218, 220 are also contemplated. The first locating member 218 is provided along a transverse axis, such as axis 212. The second locating member 220 may also be provided along a transverse axis, such as axis 212. In other examples, one of the first and second locating members 218, 220 may be provided along axis 214.

The first and second locating features 218, 220 may each contain a portion of the lost core 202 as shown. The shell 204, in conjunction with the wall 206 may completely encapsulate the core 202, or may cover a portion of the core 202. If a region of the core 202 is left uncovered, it does not interact with the injected material during formation of the engine block or other vehicle component to prevent destruction of the core.

Referring to FIG. 2, after the insert is formed at step 102, the insert 200 is inserted and positioned within a tool at step 104, and various dies, slides or other components of the tool are moved to close the tool in preparation for an injection process. A tool 250 and insert 200 are illustrated according to an example in FIG. 4.

The tool 250 has a first die 252, a second die 254, and a third die 256, although any numbers of dies are contemplated. The dies may be formed from tool steel or another suitable material for repetitive use in die casting or molding. The dies 252, 254, 256 may be provided as die slides such that they assemble and mate with one another to form the tool 250 with a surface for forming the vehicle component. Each die may be a cover die or an ejector die that cooperates with the other dies to form a mold cavity to form the vehicle component. In one example, the tool 250 is provided as a tool for a high pressure die casting process of metal, such as aluminum or an aluminum alloy. In another example, the tool 250 is provided as a tool for an injection molding process, for example, of a composite material, a polymer material, a thermoset material, a thermoplastic material, and the like.

Each die may include a support member providing a base for various cores and for forming mold cavities. In the present example, the dies may be adapted or shaped to form a portion of a cylinder cooling jacket for an engine block.

The first die slide 252 has a locating surface 258 that is configured to mate with the anchor surface 216 and constrain the insert 200. The die 252 has a mandrel 260 that is sized to be received by the liner 208 to locate the liner 208. The die 252 generally translates along the axis 210 to assemble the tool. As can be seen from the Figure, the die 252 constrains the insert 200 from motion relative to the tool such that the insert 200 is prevented from translating along axis 210, axis 212, and axis 214.

The second die slide 254 defines a first locator recess 262 sized to receive the first locating member 218 and further constrain the insert 200. The second die 254 generally translates along the axis 212 to assemble the tool. As can be seen from the Figure, the die 254 constrains the insert 200 from motion relative to the tool such that the insert 200 is prevented from rotating about axis 210, axis 212, and axis 214.

The third die slide 256 defines a second locator recess 264 sized to receive the second locating member 220 and further constrain the insert 200. The third die 256 generally translates along the axis 212 in the present example to assemble the tool. As can be seen from the Figure, the die 256 constrains the insert 200 from motion relative to the tool such that the insert 200 is prevented from rotating about axis 210, axis 212, and axis 214.

In one example, at least two of the dies constrain the insert in at least four degrees of freedom. In another example, at least two of the dies, or all three dies constrain the insert 200 in five degrees of freedom or in all six degrees of freedom.

Referring back to FIG. 2, after the tool 250 is closed with the insert 200 positioned and constrained in the tool, material is injected or otherwise provided to the tool at step 106 to generally form the vehicle component.

In one example, the material is a metal such as aluminum, an aluminum alloy, or another metal that is injected into the tool 250 as a molten metal in a high pressure die casting process. In a high pressure die casting process, the molten metal may be injected into the tool at a pressure of at least 20,000 pounds per square inch (psi). The molten metal may be injected at a pressure greater than or less than 20,000 psi, for example, in the range of 15,000-30,000 psi, and may be based on the metal or metal alloy in use, the shape of the mold cavity, and other considerations.

The molten metal flows into the tool 250 and into contact with the outer shell 204 of the insert 200 and forms a casting skin around the insert 200. The shell 204 of the insert may be partially melted to meld with the injected metal. Without the shell 204, the injected molten metal would disintegrate or deform the lost core 202. By providing the shell 204, the core 202 remains intact for later processing to form the passages or other features in the finished vehicle component.

The molten metal cools in the tool 150 to form the vehicle component, such as an engine block. The injected metal forms an engine cooling jacket having cooling passages as defined by the core 202 and other features of the tool 250. The vehicle component is then removed from the tool 150 and results in an unfinished component.

In another example, the material is a composite or polymer material that is injected into the tool 250 in an injection molding or other molding or forming process. The injection process may occur at a high pressure, and the tool may be heated and/or cooled as a part of the process to set the injected material. The material is injected and flows into the tool 250 and into contact with the outer shell 204 of the insert 200. The outer shell 204 protects the lost core material from being destroyed, deformed or changed by the injected material. The outer shell 204 may provide a skin adjacent to the injected material during the molding process. The outer shell 204 may additionally be provided with a coating or surface roughness to form a bond with the injected material as it solidifies.

The vehicle component, e.g. an engine block, is removed from the tool 250 at step 108, and any finish work is then conducted. The process in step 106 may be a near net shape casting or molding process such that little post-processing work needs to be conducted.

In the present example, the insert 200 remains in the unfinished component after removal from the tool 250. The casting skin surrounds the lost core material. The casting skin may contain at least a portion of the shell 204. A surface of the component may be machined to form the deck face of the block, for example, by milling. After machining, the lost core 202 is exposed.

The lost core 202 may be removed using pressurized fluid, such as a high pressure water jet or other solvent. In other examples, the lost core 202 may be removed using other techniques as are known in the art. The lost core 202 is called a lost core in the present disclosure based on the ability to remove the core in a post die casting or post molding process. The lost core in the present disclosure remains intact during the die casting or molding process due to the shell surrounding it. After the core 202 has been removed, the skin or outer shell provides the wall and shape of a fluid passage or other feature in the formed vehicle component, in conjunction with a wall 206 if one is present.

The tool 250 may be provided with additional inserts, similar to or shaped differently than insert 200 to provide various passages or features of the vehicle component. The inserts may have linear, curved, or other shapes to provide the passages or other features as desired. By using the insert structure as described, the features may be provided within a finished vehicle component with precision, accuracy, and control over complex geometry and small dimensions, i.e. on the order of millimeters.

Previously, various features or passages were provided using conventional techniques such as machining, which is time consuming and costly. In another example of conventional processes, a passage or feature was provided using a lost core in a low pressure casting process. However, in a high pressure casting process, a lost core may be destroyed, providing for unpredictable casting results.

Figure 6:
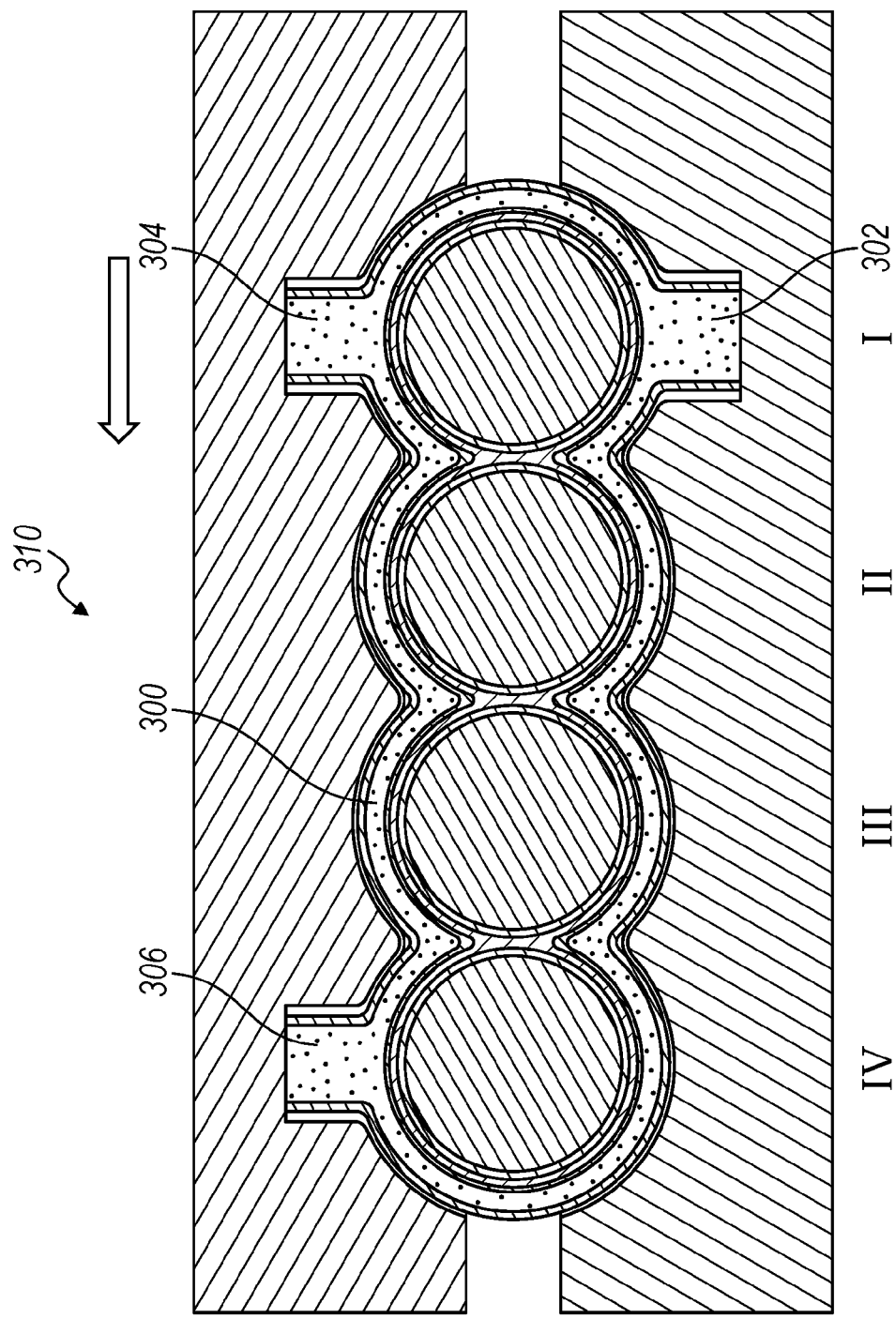
FIG. 6 illustrates a partial sectional view of a tool and an insert according to another embodiment.

Another example of an insert 300 in a tool is shown in FIG. 6. The insert 300 is constructed similarly to insert 200; however, it is a larger insert as it provides the structure for a cooling jacket surrounding four cylinders in an engine block. The top die is not shown in the Figure. The insert 300 has three locator members 302, 304, 306, and additional anchor surfaces (not shown) that contact the top die to locate and constrain the insert 300 in up to six degrees of freedom.

Because the insert 300 is a large insert, the insert is provided with additional locating features. Additionally, the locating features may be selectively placed to provide greater stability of the insert 300 within the tool 310. For example, the insert 300 may have two locating members 302, 304 for locating the insert 300 in a region for cylinder I in a finished engine block. The insert 300 may have an additional locating member 306 for locating the insert in a region for cylinder IV in a finished engine block. Additional locating features, or other placement of the locating features is also contemplated.

The locating features 302, 304, 306 may be placed to provide greater stability and reduced breakage of the insert 300 during the injection process. Insert breakage may occur for example, in thin or narrow sections of the insert, e.g. between adjacent cylinders. As the liquid or molten material (fluid) is injected into the tool 310 at a high pressure, the fluid flows and imparts forces and moments on the insert 300 and the tool surfaces. The locating features of the insert 300 may be positioned to better resist the fluid forces, or to provide a reactive force on the insert based on the interface between the insert and the tool to oppose the fluid force or stabilize the insert 300. In the present example, the fluid is injected into the tool adjacent to cylinder I, and flows generally longitudinally towards cylinder IV. The locating features are placed in the their current positions based on a fluid flow and force analysis conducted in a computational fluid dynamics software program. For example, as the material is injected adjacent to cylinder I, it is at the highest pressure and imparts the greatest forces on the insert 300 in this region, and the insert is provided with additional locating features with surfaces transverse to the fluid forces as a result.

In further examples, the insert 300 may be provided with additional features, such as structures to form bore bridge cooling passage between adjacent cylinders, or similar small dimensions, detailed structures.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A process comprising:
    forming an insert comprising a metal wall, metal shell, and lost core by positioning the metal wall and the lost core in a first tool and casting the metal shell around the lost core such that the metal wall contacts both the lost core and the metal shell, a thickness of the metal wall being greater than a thickness of the metal shell;
    positioning the insert into at least two dies of a second tool after said forming;
    closing the dies around the insert to constrain movement of the insert relative to the second tool in at least four degrees of freedom;
    injecting material into the second tool to form a vehicle component including said injected material, the metal wall, and the metal shell; and
    removing the lost core after said injecting to provide a cooling passage in the component, the cooling passage defined by the metal wall and the metal shell, and the metal wall being configured to conduct heat from the vehicle component to the cooling passage.

2. The process of claim 1 wherein said closing is conducted such that movement of the insert is constrained relative to the second tool in six degrees of freedom.

3. The process of claim 1 wherein the insert has a first locating feature sized for receival by one of the dies and a second locating feature sized for receival by another of the dies during said positioning and closing, the first and second locating features each constraining movement of the insert in three degrees of freedom of the at least four degrees of freedom, and the first and second locating features each comprising a portion of the lost core.

4. The process of claim 3 wherein the insert has an anchor surface sized for receival into a third die at least two dies of the second tool during said positioning and closing, the anchor surface constraining movement of the insert in three degrees of freedom of the at least four degrees of freedom.

5. The process of claim 1 wherein casting the metal shell comprises die casting by injecting molten metal at a pressure of less than 10 psi, wherein the molten metal comprises aluminum.

6. The process of claim 1 wherein injecting material into the second tool comprises injecting molten metal at a pressure of at least 20,000 psi, wherein the molten metal comprises aluminum.

7. The process of claim 1 wherein injecting material into the second tool comprises injecting a polymer material in an injection molding process.

8. The process of claim 1 wherein the insert has a first locating feature sized for receival by one of the dies and a second locating feature sized for receival by another of the dies during said positioning and closing, the first and second locating features each comprising a portion of the lost core, and the first and second locating features positioned to constrain movement of the insert in the second tool and to oppose a reactive force on the insert caused by flow of the injected material.

9. The process of claim 1 wherein the vehicle component is a cylinder block for an engine, and the cooling passage forms at least a portion of a cooling jacket for the cylinder block.

10. The process of claim 1 wherein the insert further comprises a cylinder liner contacting and surrounded by the metal wall, and wherein the cooling passage in the vehicle component surrounds the liner.

11. The process of claim 10 wherein the lost core is arranged radially outboard of and surrounding the metal wall, and wherein at least a portion of the metal shell is cast radially outboard of and surrounding the lost core.

12. The process of claim 10 wherein the liner is press fit into the metal wall.

13. The process of claim 1 wherein the insert has a longitudinal axis, a first transverse axis, and a second transverse axis;
- wherein a portion of the outer surface of the lost core is arranged in contact with a surface of the metal wall;
- wherein the lost core is provided with a shape prior to forming the insert in accordance with a shape of the cooling passage in the component, the lost core is provided with a first locating member extending outwardly from an intermediate region of the core along the first transverse axis and a second locating member extending outwardly from the intermediate region of the core along the second transverse axis, and the second locating member is spaced apart from the first locating member; and
- wherein the metal shell is cast into contact with and covering a portion of the outer surface of the lost core.

* * * * *